H. E. HOINES.
MOTOR VEHICLE.
APPLICATION FILED APR. 7, 1913.
1,087,372.
Patented Feb. 17, 1914.
3 SHEETS—SHEET 2.
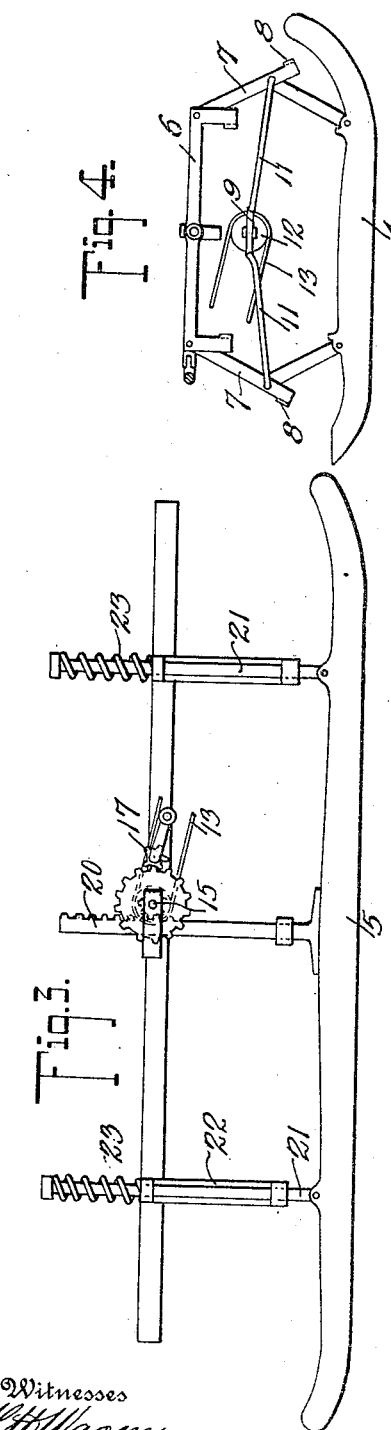
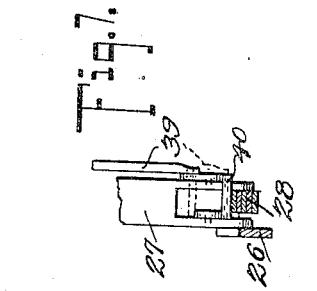
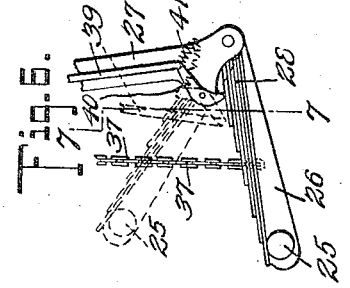
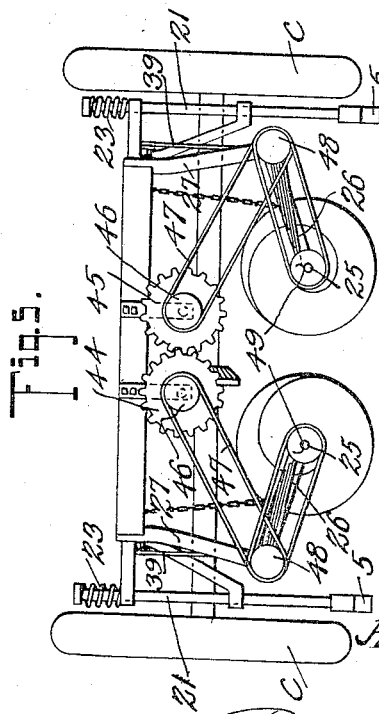
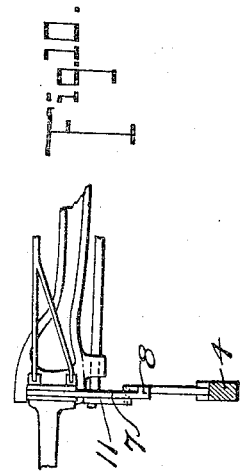
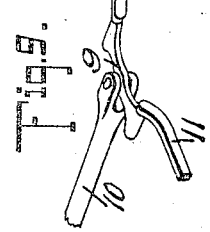
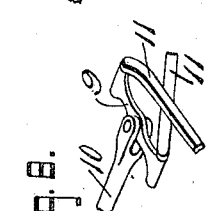
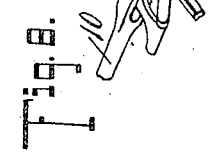
Witnesses
E. H. Wagner.
G. W. Kirkley
Inventor
Halvor E. Hoines
By Robert Robb
Attorney

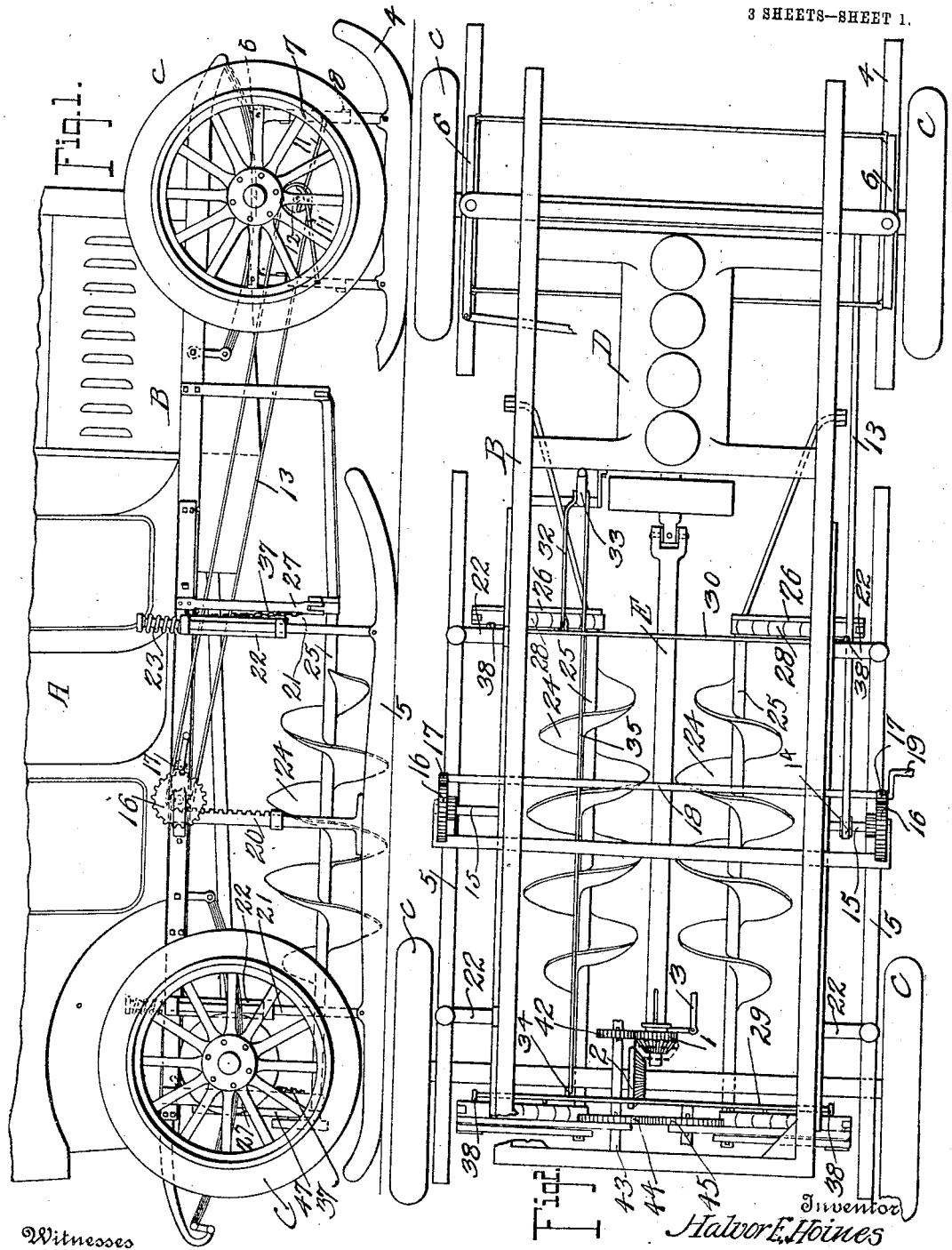

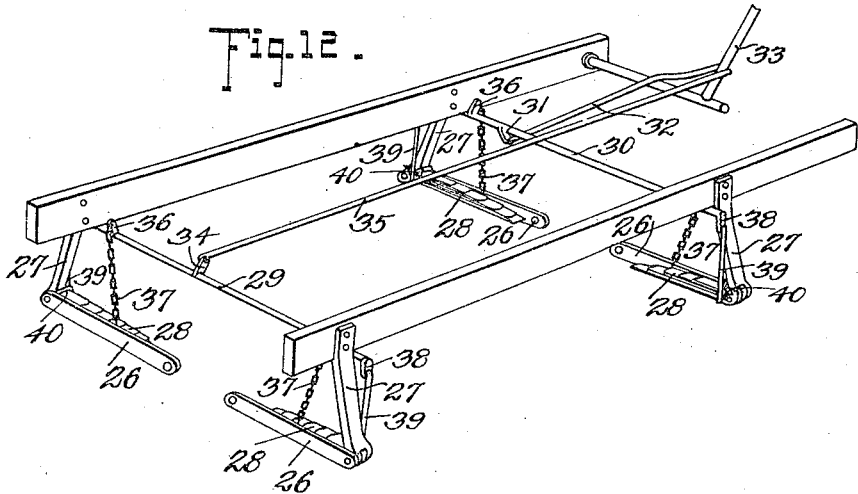
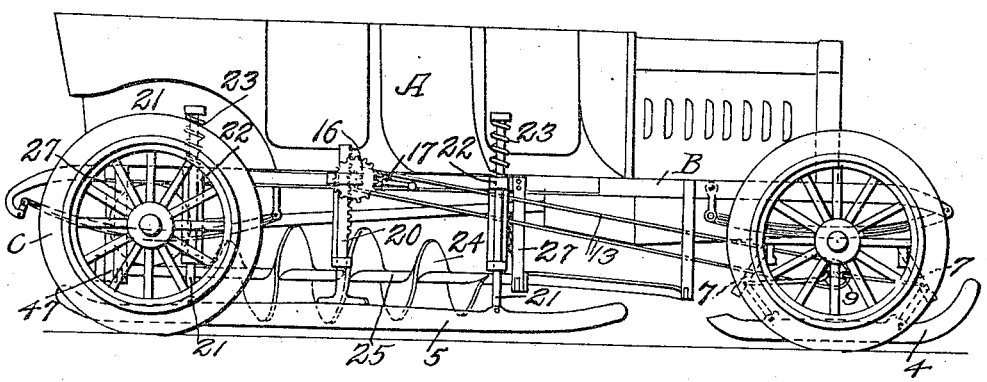
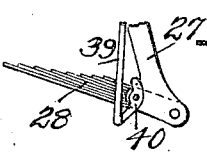 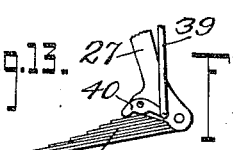 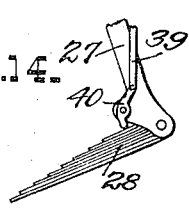

UNITED STATES PATENT OFFICE.

HALVOR E. HOINES, OF LAKE PARK, MINNESOTA.

MOTOR-VEHICLE.

1,087,372.   Specification of Letters Patent.   Patented Feb. 17, 1914.

Application filed April 7, 1913. Serial No. 759,417.

*To all whom it may concern:*

Be it known that I, HALVOR E. HOINES, a citizen of Norway, residing at Lake Park, in the county of Becker and State of Minnesota, have invented certain new and useful Improvements in Motor-Vehicles, of which the following is a specification.

It has been proposed in the art of motor vehicles to provide a wheeled vehicle having runners associated therewith whereby the vehicle may be converted into a sleigh.

The present invention embodies certain improvements in the above type of machines and contemplates broadly the application of runners to an automobile or similar wheeled vehicle combined with propellers for operating the vehicle when the same is supported by its runners, drive means being used whereby the vehicle may be propelled by its rear wheels from the motor, and whereby the propulsion means for operating the machine when supported by the runners may also be operated from said motor.

The invention involves certain novel mechanism for rendering the runners operative to support the machine instead of the wheels, together with peculiar mechanism for resiliently acting on the propellers which propel the machine when the runners are in use, as when the vehicle must be driven over snow.

The invention involves other special features of construction and operation in relation to the driving mechanism, runners and propulsion means, all of which will appear fully on reference to the following description and to the accompanying drawings, in which—

Figure 1 is a fragmentary side view of an automobile equipped with the invention. Fig. 2 is a plan view of the same, the body of the vehicle removed. Fig. 3 is a side view showing more clearly the means for supporting and moving the rear runners. Fig. 4 is a similar view showing, however, the front runner mechanism. Fig. 5 is a rear view of the machine as illustrated in Fig. 2. Fig. 6 is a detail fragmentary view showing more clearly the means for locking the resilient propeller supporting devices in operative positions. Fig. 7 is a section on the line 7—7 of Fig. 6. Fig. 8 is a detail perspective view showing more clearly the positions of the actuating links for the supporting arms of the front runners when said runners are lowered. Fig. 9 is a detail view of the means shown in Fig. 8, as adjusted when the front runners are inactive. Fig. 10 is a fragmentary view showing more clearly the supporting means for each front runner. Fig. 11 is a view similar to Fig. 1, illustrating the runners and snow propellers in inoperative position. Fig. 12 is a detail perspective view bringing out more clearly the manual means for controlling the raising and lowering of the propellers. Figs. 13, 14 and 15 are fragmentary views showing the several positions assumed by the lock member in the operation of lowering each propeller to an operative position.

Throughout the following detail description and on the several figures of the drawings, similar parts are referred to by like reference characters.

As shown in Figs. 1 and 2, the invention is applied to a conventional form of automobile such as at present in use, A denoting the body of the machine and B the chassis. The vehicle has the usual front and rear wheels C and is propelled by an explosive engine or motor D. The motor shaft E leads from the motor D to the rear end of the machine (see Fig. 2), and carries at its rear end a combined bevel and spur gear 1. The gear 1 is adapted to mesh with differential gearing 2 on the rear axle of the vehicle, said gear 1 being splined upon and therefore shiftable longitudinally of the shaft E by suitable mechanism incompletely shown at 3. When the gears 1 and 2 are operatively engaged, the machine will be used as an ordinary motor propelled vehicle, power being transmitted from the motor D to the rear driving wheels C.

Should the operating conditions for the vehicle be such that it is desired to convert the same into a sleigh, as when the ground is covered with snow, it is contemplated to use the front and rear runners 4 and 5, respectively. The front runners 4 are supported by a frame 6, carried by the front axle of the vehicle, each runner being attached to said frame by a pair of toggle links 7, the upper member of each link 7 having a lateral stop 8 to limit movement of the parts of the link in one direction. A lever 9 is pivotally mounted at each end of a shaft 10 beneath the frame 6, and said lever is connected by rods 11 with the toggle links 7, the outer ends of the rods 11 constituting the pivotal connections between the members of each link. It will be apparent that by turning the shaft 10, the rods 11 will be moved so as to cause the members of the links 7 to be alined or to break joint, a lowering and raising movement being thus imparted to the runners 4 supported by said links.

For the purpose of turning the shaft 10, a pulley 12 is secured to said shaft and a belt 13 passes around said pulley and extends rearwardly to a pulley 14 on a stub shaft 15 projecting from one side of the chassis B. There are two of the shafts 15 on the chassis B, one only, however, carrying the pulley 14, but both being supplied with gears 16. The gears 16 are adapted to be rotated by pinions 17 on a shaft 18 mounted transversely of the chassis B, said shaft 18 having a crank handle 19 for turning purposes. The gears 16 are provided with pinions on their inner sides, rigid therewith and engaging racks 20, the lower ends of which are attached to the rear runners 5. The runners 5 have at their front and rear ends vertical guide members 21 which pass through suitable guide brackets 22 on the chassis B, springs 23 surrounding the guide members 21 at their upper ends and bearing against the upper portions of the brackets 22 in such a way as to normally tend to raise the runners 5.

From the foregoing, it will be observed that when it is desired to lower the runners 4 and 5 from their inoperative positions, as shown in Fig. 11, to their active positions, as shown in Fig. 1, it is only necessary for the operator to turn the handle 19, thereby rotating the shafts 18 and 10, each of which is operatively connected with the members 20 and 7, respectively, in the manner above described.

In view of the fact that when the runners 4 and 5 are lowered, the vehicle is supported thereon and the wheels C elevated so that the machine cannot be propelled by the rearmost of said wheels, it is obvious that other propulsion means must be employed when driving the vehicle while employed as a sleigh or sled. The latter means consists, preferably, of two propellers 24 of the screw type, each propeller consisting of a spiral blade and a shaft 25 mounted in suitable bearings in the inner ends of arms 26, a pair of which is used for each propeller, said arms being pivoted at their outer ends upon brackets 27 supported on the chassis B. Heavy leaf springs 28 engage over the ends of the shaft 25 of each propeller, said springs being carried by brackets 27, and therefore tending to resiliently hold the propellers in engagement with the snow over which the machine travels when used as a sleigh. To cause the springs 28 to act resiliently on the shafts 25, it is contemplated to provide a peculiar lock and to raise the propellers when not in use suitable means are provided, the latter being also common to the lock means just mentioned. In other words, as shown in Fig. 12, shafts 29 and 30 are mounted in suitable bearings on the chassis B above the opposite ends of the propeller shafts 25. The shaft 30 has a central arm 31 projecting downwardly and connected by a rod 32 with a hand lever 33. The shaft 29 has a central arm 34 connected by a rod 35 with said lever 33. Each of the shafts 29 and 30 has at each end an upwardly projecting arm 36 connected by a chain 37 with the pivoted arm 26 just beneath; also a downwardly projecting arm 38 connected by a rod 39 with a lock member 40 which is pivoted to the adjacent bracket 27. The lock member 40 is quite clearly illustrated in Figs. 6 and 7. It is of U-form and its transverse portion is adapted to engage the upper side of the adjacent spring 28 near the connection of the latter with the bracket 27. A coiled spring 41 is connected with one arm of the lock member 40 and the parts just described operate as follows: Assuming that the runners have been lowered into their proper positions to render the propellers 24 operative, the lever 33 is manually moved rearward. This action causes movement of the lever to be transmitted to the shafts 29 and 30 and the arms 36 of each shaft are lowered with their chains or connections 37, thus permitting the propeller carrying arms 26 to drop sufficiently to permit the propellers to engage with the snow. Simultaneously with the downward movement of the arms 36 of each shaft last mentioned, the springs 41 connected with the lock members 40 pull said lock members from the positions in which they are shown in Fig. 13 to the positions shown in Fig. 14, and the continued movement of the shafts 29 and 30 causes the arms 38 to pull upward on the long arm of each lock member 40 so that the transverse portion of the latter positively engages the upper side of the spring 28 and places this spring under the required tension to cause the propeller with which it coöperates to be resiliently held in engagement with the snow or surface. The last position assumed by the lock members under the positive action of the arms 38, is illustrated in Fig. 15. Of course, when the propellers are not to be used, they may be raised readily by pushing the lever 33 forward, whereupon the arms 26 will be elevated and the lock members 40 restored to their positions as shown in Fig. 13. When, however, the propellers are lowered for active use, in the manner described, the operator will shift the gear 1 on the engine shaft E forward until said gear engages with a gear 42 carried by a shaft 43. Under these conditions, the gears 1 and 2 are disengaged so that the motor D is no longer connected with the rear driving axles of the vehicle but is now connected with the shaft 43. On the shaft 43 is also a gear 44 which meshes with a gear 45, the two gears 44 and 45 being provided with pulleys 46 connected by belts 47 to pulleys 48 mounted at the lower ends of the brackets 27. The pulleys 48 are in turn connected to pulleys 49 on the rear ends of the propeller shafts 25.

With the connections as last set forth, the operation of the motor D will transmit power to the shaft 43 and the gearing between the shaft 43 and propeller shafts 25 will cause the propellers 24 to be driven at any desired speed under the control of the operator of the machine. The motor D is therefore adapted to be interchangeably connected with the propellers 24 or with the rear drive wheels C of the vehicle, as required under different conditions of service, namely, when the vehicle is used as a sleigh, or ordinary automobile, respectively.

Having thus described the invention, what I claim as new is:

1. In combination, a vehicle comprising driving wheels normally inoperative, runners for said vehicle, means for throwing the runners into operative positions and simultaneously rendering the driving wheels inoperative, propellers adapted for use when the runners are employed to support the vehicle, a motor, and means for interchangeably connecting the motor with the driving wheels and propellers comprising a motor shaft, propeller shafts, and gearing for connecting the motor shaft with the driving wheels or with the propeller shafts.

2. In a vehicle of the class described, the combination of a body, runners for supporting said body, propulsion means comprising propellers, arms supporting said propellers, an operating device for raising and lowering the arms of the propellers to impart corresponding movement to the latter, and lock means coacting with the propellers and controlled by said operating device.

3. In a vehicle of the class described, the combination of a body, runners for supporting said body, propellers for driving the body, means for raising and lowering the propellers, and lock means for coöperation with the propellers when the same are in their lowered operative position and controlled by the means for raising and lowering the propellers.

4. In a vehicle of the class described, the combination of a body, runners for supporting said body, propellers, means for raising and lowering the propellers, springs coacting with the propellers to resiliently hold the same in their operative positions, lock means coacting with the springs, and means intermediate said springs and the lock means and the propeller raising and lowering means, whereby the former are controlled by the last mentioned means.

5. In a vehicle of the class described, the combination of a body, runners for supporting said body, brackets depending from the body, arms pivoted to said brackets, a propeller mounted on said arms, spring means carried by the brackets and coöperating with the propeller, a shaft, a connection between said shaft and one of the arms, a lock member coacting with the spring means and also connected with said shaft, and means for operating the shaft to lower the arms with the propeller carried thereby, and to simultaneously cause coöperative action between the lock member and the spring means aforesaid.

In testimony whereof I affix my signature in presence of two witnesses.

HALVOR E. HOINES.

Witnesses:
P. R. JACOBSON,
J. O. LORENTZEN.